W. H. PARKER.
WHEELBARROW.
APPLICATION FILED MAR. 1, 1916.

1,198,264.

Patented Sept. 12, 1916.

WITNESSES

INVENTOR
William H. Parker
BY
ATTORNEYS

UNITED STATES PATENT OFFICE.

WILLIAM H. PARKER, OF LONG BRANCH, NEW JERSEY.

WHEELBARROW.

1,198,264.  Specification of Letters Patent.  Patented Sept. 12, 1916.

Application filed March 1, 1916.  Serial No. 81,378.

*To all whom it may concern:*

Be it known that I, WILLIAM H. PARKER, a citizen of the United States, and a resident of Long Branch, in the county of Monmouth and State of New Jersey, have invented a new and Improved Wheelbarrow, of which the following is a full, clear, and exact description.

This invention relates to wheelbarrows and particularly to an improved arrangement especially adapted for transporting and mixing concrete.

The object in view is to provide an improved arrangement of parts whereby a wheelbarrow effect will be produced and also a mixing member may be provided which will mix small batches at a time and discharge the same at the point desired.

Another object in view is to provide a wheelbarrow with supporting framework having the bracing members spread so that a rotatable body may be mounted on the framework and adjusted so that the concrete may be mixed at the point where it is used and dumped in comparatively small quantities.

Figure 1:
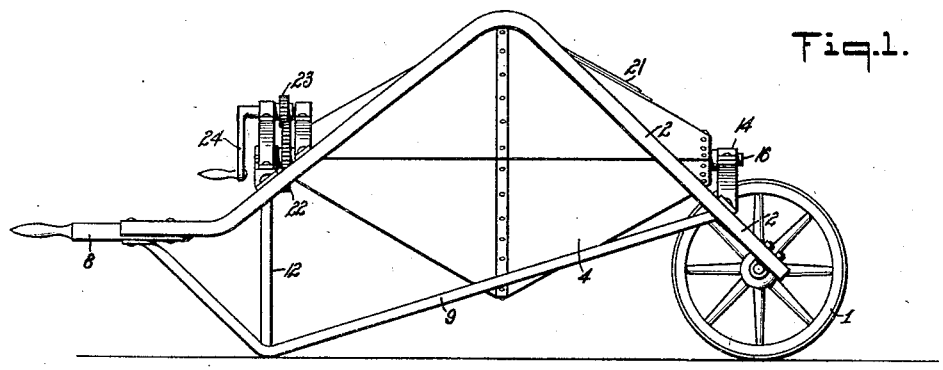
Figure 2:
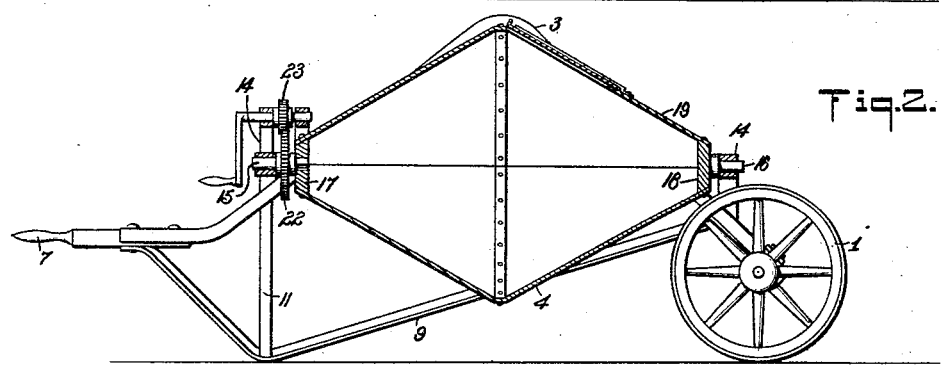
Figure 3:
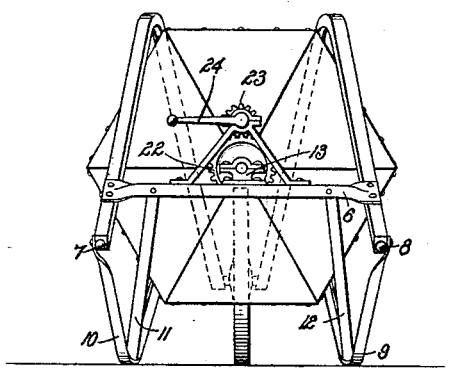
Figure 4:
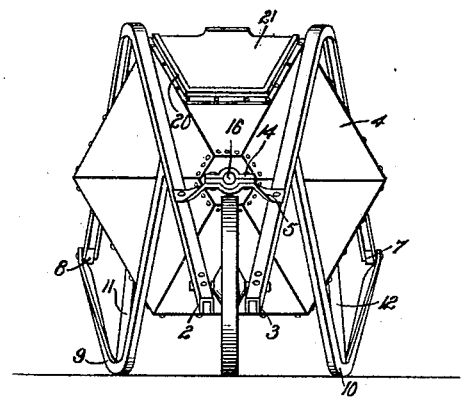

In the accompanying drawing: Figure 1 is a side view of a wheelbarrow embodying the invention. Fig. 2 is a longitudinal vertical section through the structure shown in Fig. 1. Fig. 3 is a rear view of the structure shown in Fig. 1. Fig. 4 is a front view of the structure shown in Fig. 1.

Referring to the accompanying drawing by numerals, 1 indicates a traction wheel of any desirable kind connected by a suitable axle and journal members to the beams 2 and 3. These beams may be of any desired construction in cross section but are shown in the drawing as U-shaped and are bent or, rather, spread so as to provide a substantially A-shaped structure in order that the drum 4 may be properly swung on the cross braces 5 and 6 arranged at the front and back, respectively. The beams 2 and 3 are preferably spread gradually toward the rear and have connected therewith suitable handles 7 and 8. In order to stiffen and hold the parts properly, bracing runners 9 and 10 are connected to the handles 7 and 8, respectively, and to the beams 2 and 3 near the front, the connection being by any suitable means, as for instance, bolts.

A pair of upright braces 11 and 12 are provided near the rear and connect the runners 9 and 10 with the rear brace 6. The brace 6 carries a journal member 13, while brace 5 carries a journal member 14, these journal members accommodating the stub shafts 15 and 16, respectively, as shown more particularly in Fig. 2. The stub shafts are connected to suitable end members 17 and 18 which in turn are connected to the sheet metal body 19 of the drum 4. The drum 4 may be made of any suitable material but preferably is made from sheet metal and is also preferably made irregular as to shape as for instance, hexagon in cross section, so that when the drum is rotated the matter therein will be mixed and tossed from side to side. At one part of the drum suitable guiding members 20 are provided on opposite sides of an opening, which opening is adapted to be closed by a slide or lid 21 fitting the guiding members 20.

In order to provide for properly rotating the drum 4, shaft 5 has a gear wheel 22 rigidly secured thereto which meshes with the pinion 23 connected to the crank 24, whereby when the crank 24 is rotated the drum will be rotated. As the pinion 23 is smaller than gear wheel 22 a leverage is provided in order that the drum may be easily rotated even when carrying a comparatively heavy load.

In operation when it is desired to use the wheelbarrow which is in effect a combined wheelbarrow and concrete mixing device, the wheelbarrow is moved to where the supply of sand, cement and the like is located so that a proper dry mixture may be placed in the wheelbarrow and then the wheelbarrow is moved to the place where the concrete is to be mixed. Water is then placed in the drum 4 and the covering member 21 closed. The crank 24 is operated and the drum is rotated for any desired length of time until the ingredients have been well mixed, and then the lid or covering member 21 removed, after which the drum is turned over and the contents discharged. It is evident that the water could be placed in the drum at any point or, also, that the ingredients could be placed into the drum at different points, and the wheelbarrow moved to the place where the concrete is to be used. This obviates the necessity of mixing a large batch at a distance and then moving the mixed batch to the place desired.

What I claim is:

1. In a device of the character described, a wheelbarrow provided with a traction member, a pair of supporting beams connected with said traction member and diverging toward the rear, said beams being bent upwardly centrally so as to produce a substantially A-shaped structure, a transverse bracing member connected with said beams adjacent the front, and a transverse bracing member connecting said beams adjacent the rear.

2. In a device of the character described, a wheelbarrow structure provided with a pair of beams bent substantially centrally so as to form an A-structure, traction means connected with said beams adjacent the front end, and bracing means connecting said beams for preventing lateral movement thereof.

3. In a wheelbarrow of the character described, a traction wheel, a pair of supporting bars therefor merging into operating handles, said bars being substantially A-shaped when viewing the same from one side, a similarly shaped bracing bar for each of said supporting bars, said bracing bars being connected to said supporting bars near the front of said supporting bars and near the rear, a transverse bracing bar connected with said supporting bars adjacent each end, and means for mounting a rotatable member on said transverse bars between the supporting bars.

4. In a device of the character described, a wheelbarrow structure comprising a pair of beams bent substantially centrally so as to provide an A-structure, a supporting bar for each of said beams formed of substantially the same shape as the beams but reversed so as to provide a combined brace and support, a traction member connected with the front of said beams, and means for holding said beams spaced apart.

In testimony whereof I have signed my name to this specification in the presence of two subscribing witnesses.

WILLIAM H. PARKER.

Witnesses:
ALVIN SWAIM,
BURDEN M. HALEY.

Copies of this patent may be obtained for five cents each, by addressing the "Commissioner of Patents, Washington, D. C."